C. W. OBERT.
AUXILIARY PRESSURE RELIEF DEVICE FOR STEAM BOILERS.
APPLICATION FILED JAN. 27, 1920.
1,429,296.  Patented Sept. 19, 1922.
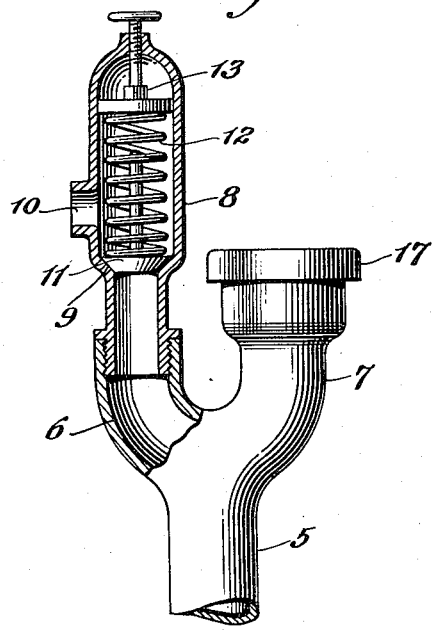
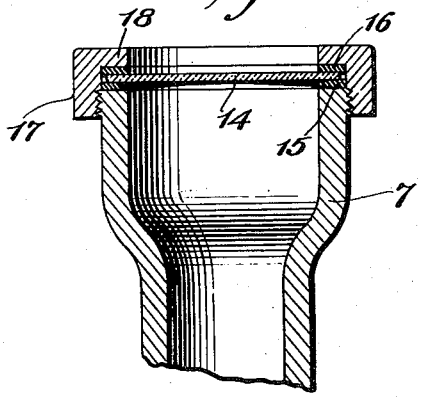
Inventor
Casin W. Obert,
By Attorney
C. P. Goefel.

Patented Sept. 19, 1922.

1,429,296

UNITED STATES PATENT OFFICE.

CASIN W. OBERT, OF MOUNT VERNON, NEW YORK.

AUXILIARY PRESSURE-RELIEF DEVICE FOR STEAM BOILERS.

Application filed January 27, 1920. Serial No. 354,329.

*To all whom it may concern:*

Be it known that I, CASIN W. OBERT, a citizen of the United States, and a resident of the city of Mount Vernon, county of Westchester, and State of New York, have invented certain new and useful Improvements in Auxiliary Pressure-Relief Devices for Steam Boilers, of which the following is a full, clear, and exact description.
This invention relates to an auxiliary pressure relief device for pressure vessels, and has for its primary object to provide simple and effective means for relieving the pressure in case the ordinary relief valve with which the vessel is equipped, should it stick to its seat, or for any other reason become inoperative, and thus obviate the possible disruption of the vessel. The device is particularly adapted for steam and hot water heating boilers.

With the above end in view the invention in one embodiment thereof consists in the provision of a frangible disc covering and normally closing an outlet, together with means for detachably securing said disc in position in such manner that the securing means will not subject the disc to cross strains. This disc is formed of glass or other non-corrosive, non-ductile brittle material.
With a closure disc of this nature secured in the manner hereinafter explained, the pressure requisite to break the disc may be accurately governed or regulated simply by varying the thickness and diameter of the disc. This feature of my invention is of primary importance since it renders the device applicable for use in connection with the common type of safety or relief valves now generally employed. As is well known, a safety or relief valve is adjusted so that it will remain closed under the working pressure, but will open when the pressure for which it is set, is attained, and thus prevent excessive pressure. However, it is not an uncommon occurrence for a safety or relief valve to adhere so tightly to its seat that it will not be forced to open position when the pressure for which it is set is attained. In such a case there is imminent danger of disruption or explosion of the boiler or pressure vessel, attended with possible loss of life and destruction of property.

I therefore propose to apply my auxiliary pressure relief device to a branch outlet contiguous to the conduit leading to the safety or relief valve, so that the pressure acting upon the safety or relief valve and upon the frangible disc of the auxiliary relief device will be the same. Thus, after the safety or relief device has been set to the desired pressure, the auxiliary relief device may be provided with a frangible disc of predetermined thickness and diameter, offering resistance to a definitely ascertained pressure above that for which the safety or relief valve is set, so that the breakage of said disc, and the relief of the pressure will occur immediately upon an increase in pressure of a predetermined amount above that for which the safety or relief valve is set, in case the safety or relief valve should fail to operate.

With the above and other objects in view, my invention consists in the provision of an improved auxiliary pressure relief device for steam or hot water boilers, or other pressure vessels, and in the form, construction and relative arrangement of the several parts, as will be hereinafter more fully explained, illustrated in the accompanying drawing, and subsequently incorporated in the subjoined claims.

In the drawing, wherein similar reference characters designate corresponding parts throughout the several views, and in which I have illustrated one practical embodiment of the invention:

Figure 1 is an elevation showing my improved auxiliary pressure relief device, as used in connection with a safety or relief valve, and, Figure 2 is an enlarged longitudinal sectional view of the device.

Referring in detail to the drawing, 5 designates an outlet conduit for the steam or other fluid under pressure which is coupled or connected to the boiler or pressure vessel in any approved manner. This conduit is provided with the lateral branches 6 and 7 respectively, and to the branch 6 thereof the safety valve casing 8 is connected. This valve casing is provided with a valve seat 9, and an outlet 10 at one side of said seat. The said outlet 10 is normally closed by means of the valve 11, which is yieldingly urged to its closed position upon the seat 9 by the spring 12. Suitable means 13 is provided whereby the tension of this spring may be adjusted or regulated. It will be understood that the safety or relief valve constitutes no essential feature of the present invention, as various other types of valves might be used in lieu of one having the structural details above referred to and illustrated in the drawing. Ordinarily the adjusting means of the safety valve is locked by a suitable locking device after the valve is set.

The improvement constituting the subject-matter of the present application, consists primarily in a disc 14, preferably of glass or porcelain, though other materials of a non-corrosive and non-ductile nature may be used. This disc is engaged over the open end of the lateral branch 7 of the conduit 5, and is seated upon an annular packing ring or gasket 15 of yielding material. A similar packing gasket 16 is also disposed upon the opposite side face of the disc 14 at the edge thereof. The wall of the conduit branch 7 is exteriorly threaded at its end to receive the cap ring 17, which is formed with an inwardly extending flange 18 to engage upon the gasket 16. In this manner it will be readily seen that the disc 14 may be tightly clamped or secured in its applied position without inducing cross strains in the disc, and when thus secured in place the escape of the fluid under pressure around the edges of said disc is effectually precluded.

In practice, having first determined the pressure which it is desired to maintain on the boiler, or other pressure vessel, a disc 14 of the requisite thickness, is selected and arranged over the end of the conduit branch 7, as above explained. Where the pressures are high, the diameter of the disc may be made smaller than for lower pressures, there being a certain range of thickness of the disc as compared with its diameter, which gives the best results. If, owing to corrosion, the valve 11 should stick fast to its seat, or some one should accidentally or maliciously change the tension of the safety valve spring, the increase of pressure in the conduit 7 above the predetermined point will act against the inner face of the disc 14, and when the pressure reaches that for which the disc is designed, it will completely disrupt or break out this disc before there can be any dangerous increase of the pressure. The pressure at which the disc will break may vary somewhat from a given figure, say, exactly thirty pounds per square inch. However, the breaking point can readily be made to come within a given range, say thirty to thirty-five pounds per square inch, which will meet all ordinary requirements, and by special means may be brought to even a closer range. Of course, if the safety or relif valve should operate properly, the auxiliary relief device will, in no way, be affected. By means of such an auxiliary relief device absolute safety in assured. It will ordinarily be necessary to renew the disc 14 only at infrequent intervals, and the cost of the disc will, in any event, be very small.

While I prefer to use the auxiliary relief device in direct conjunction with a safety or relief valve, as above explained, it will, nevertheless, be understood that if desired the device may be connected at some remote point of the system.

The surface areas of the safety valve and of the disc 14 against which the fluid pressure acts, may be the same, or the area of the disc 14 may be greater or less than that of the valve. In every case the resistance offered to the disruptive effects of the pressure on the disc 14 is determined by the thickness and the diameter of the disc.

From the foregoing description, considered in connection with the accompanying drawing, the construction, manner of operation and several advantages of the invention will be clearly and fully understood. The device is exceedingly simple in its construction, and may be readily adapted for use in connection with the ordinary steam and hot water heating boilers at nominal cost.

I have herein referred to one practical means for securing the frangible pressure relief disc in its operative position, but it will be understood that this, as well as the several other features of the device, herein referred to, are susceptible of considerable modification. Accordingly I reserve the privilege of adopting all such legitimate chances in the form, construction and relative arrangement of the various parts of the device as will be fairly embodied within the spirit and scope of the invention as claimed.

What I claim is:

1. In a pressure device, a branch pipe having a relief valve in one branch of the pipe, a rupturable diaphragm in the other branch, cushioning means for engaging the diaphragm at its edges, and means for confining the diaphragm and the cushioning means in the pipe branch.

2. In a pressure device, a branch pipe having a relief valve in one branch of the pipe, a rupturable diaphragm of vitreous material in the other branch, a cushioning ring extending continuously about the lower edge of the diaphragm and resting between the diaphragm and the branch pipe, a second ring of cushioning material lying upon the upper edge of the diaphragm and extending continuously therearound, and a confining flanged cap having threaded engagement with the branch pipe and having a flange extending continuously about upon the upper cushioning ring for firmly holding the disk in place without subjecting it to compressive strains.

In testimony that I claim the foregoing as my invention, I have signed my name hereunder.

CASIN W. OBERT.